(12) United States Patent
Kuroda

(10) Patent No.: US 8,893,235 B2
(45) Date of Patent: Nov. 18, 2014

(54) INFORMATION PROCESSING APPARATUS, CONTROL METHOD THEREFOR, AND STORAGE MEDIUM STORING PROGRAM THEREOF

(75) Inventor: Shigeki Kuroda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/335,240

(22) Filed: Dec. 22, 2011

(65) Prior Publication Data

US 2012/0204234 A1  Aug. 9, 2012

(30) Foreign Application Priority Data

Feb. 8, 2011  (JP) ................... 2011-025342

(51) Int. Cl.
*G06F 17/30* (2006.01)
*H04L 29/08* (2006.01)
*G06F 21/60* (2013.01)
*G06F 21/31* (2013.01)
*H04L 29/06* (2006.01)

(52) U.S. Cl.
CPC ............... *G06F 21/31* (2013.01); *H04L 67/02* (2013.01); *G06F 21/608* (2013.01); *G06F 2221/2119* (2013.01); *G06F 2221/2117* (2013.01); *H04L 63/08* (2013.01)
USPC .......................................................... 726/4

(58) Field of Classification Search
USPC .......................................................... 726/4
See application file for complete search history.

(56) References Cited

U.S. PATENT DOCUMENTS

| 6,424,947 | B1 * | 7/2002 | Tsuria et al. ............... 705/1.1 |
| 2004/0128532 | A1 * | 7/2004 | Ohishi et al. ............... 713/200 |
| 2007/0067828 | A1 * | 3/2007 | Bychkov ........................ 726/3 |
| 2008/0022087 | A1 * | 1/2008 | Tsujimoto ................... 713/155 |
| 2010/0122319 | A1 * | 5/2010 | Nakashima .................... 726/2 |

FOREIGN PATENT DOCUMENTS

| JP | 2004-334741 A | 11/2004 |
| JP | 2007-279974 | 10/2007 |
| JP | 2008-059187 A | 3/2008 |
| JP | 2009-205539 A | 9/2009 |
| JP | 2011-003085 A | 1/2011 |

OTHER PUBLICATIONS

Japanese Patent Application No. 2011-025342.

* cited by examiner

*Primary Examiner* — Kambiz Zand
*Assistant Examiner* — Abiy Getachew
(74) *Attorney, Agent, or Firm* — Cowan, Liebowitz & Latman, P.C.

(57) ABSTRACT

An information processing apparatus acquires, from a Web server, an operation screen for inputting authentication information, displays the acquired operation screen, and accepts authentication information input by a user. The apparatus then executes authentication processing using the accepted authentication information without transmitting the authentication information to the Web server, and authorizes, when the authentication succeeds, the user to use a function of itself.

9 Claims, 11 Drawing Sheets

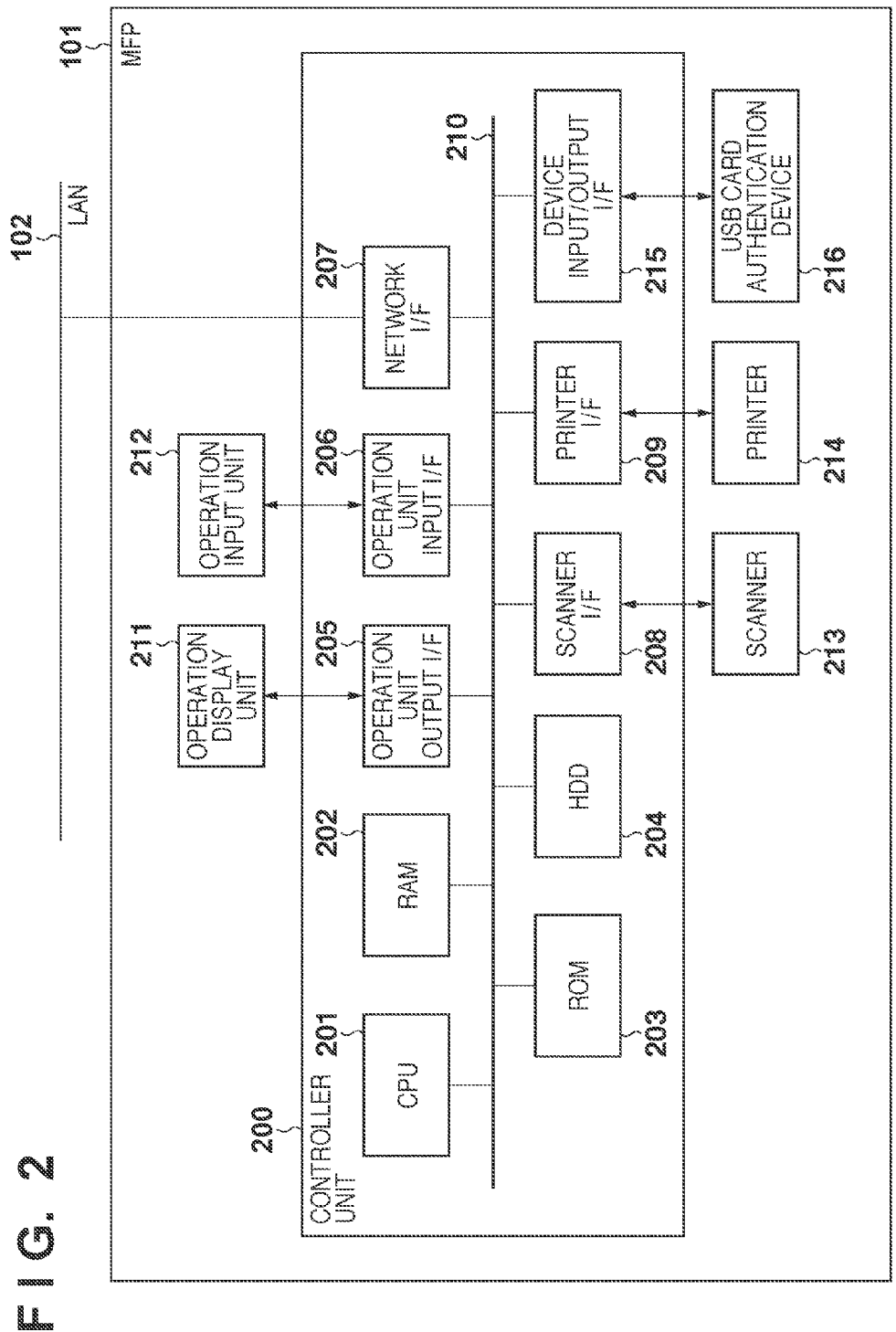

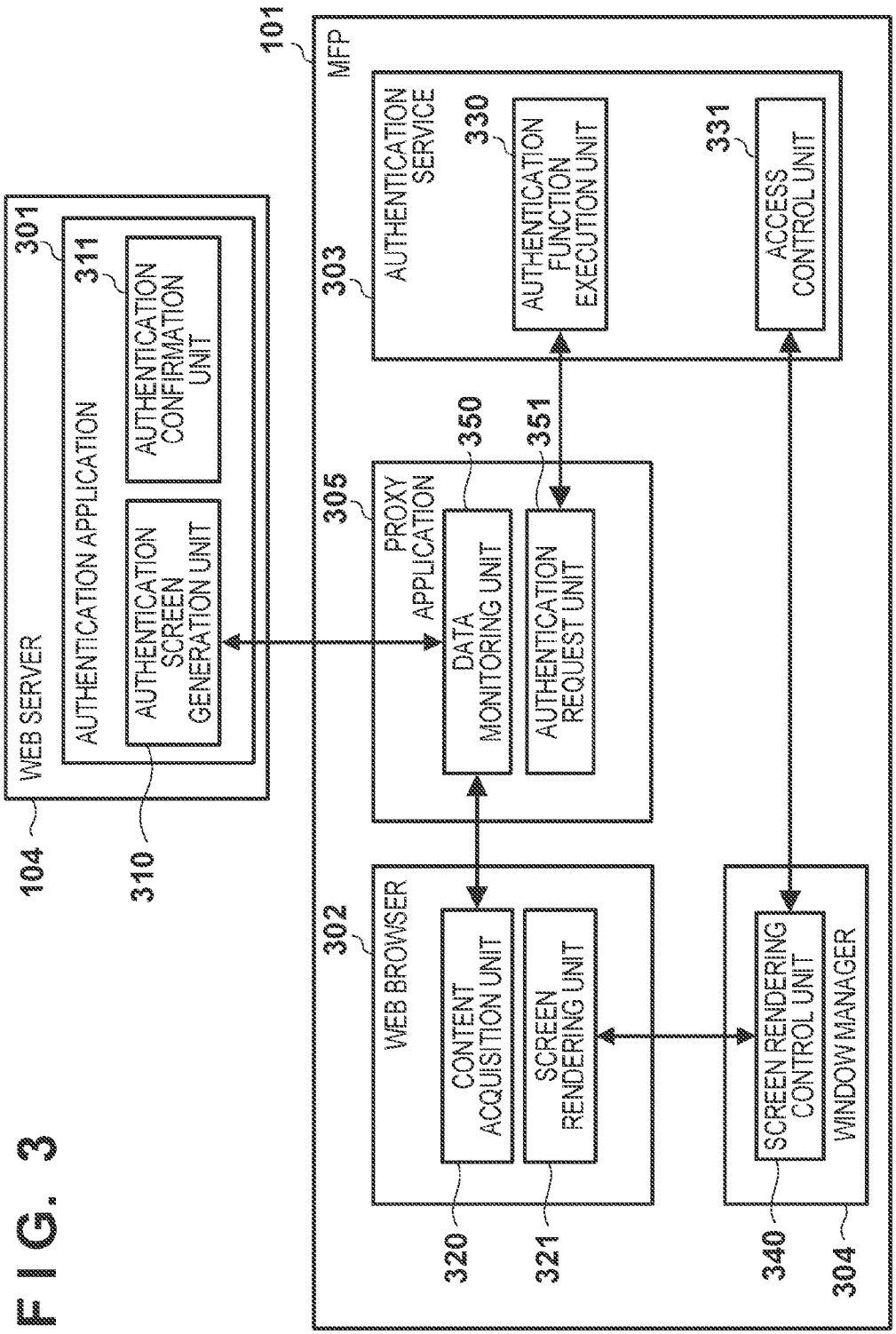

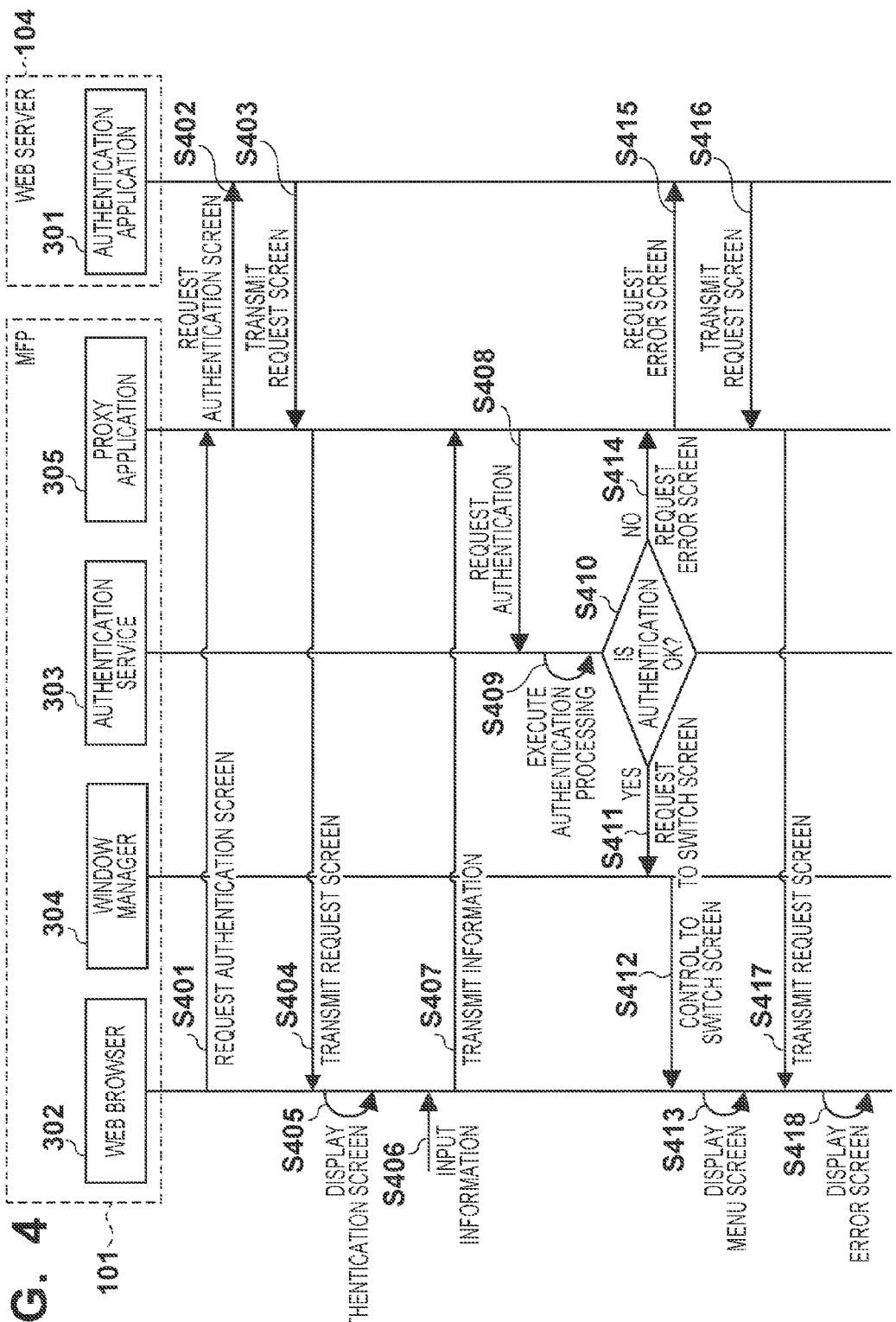

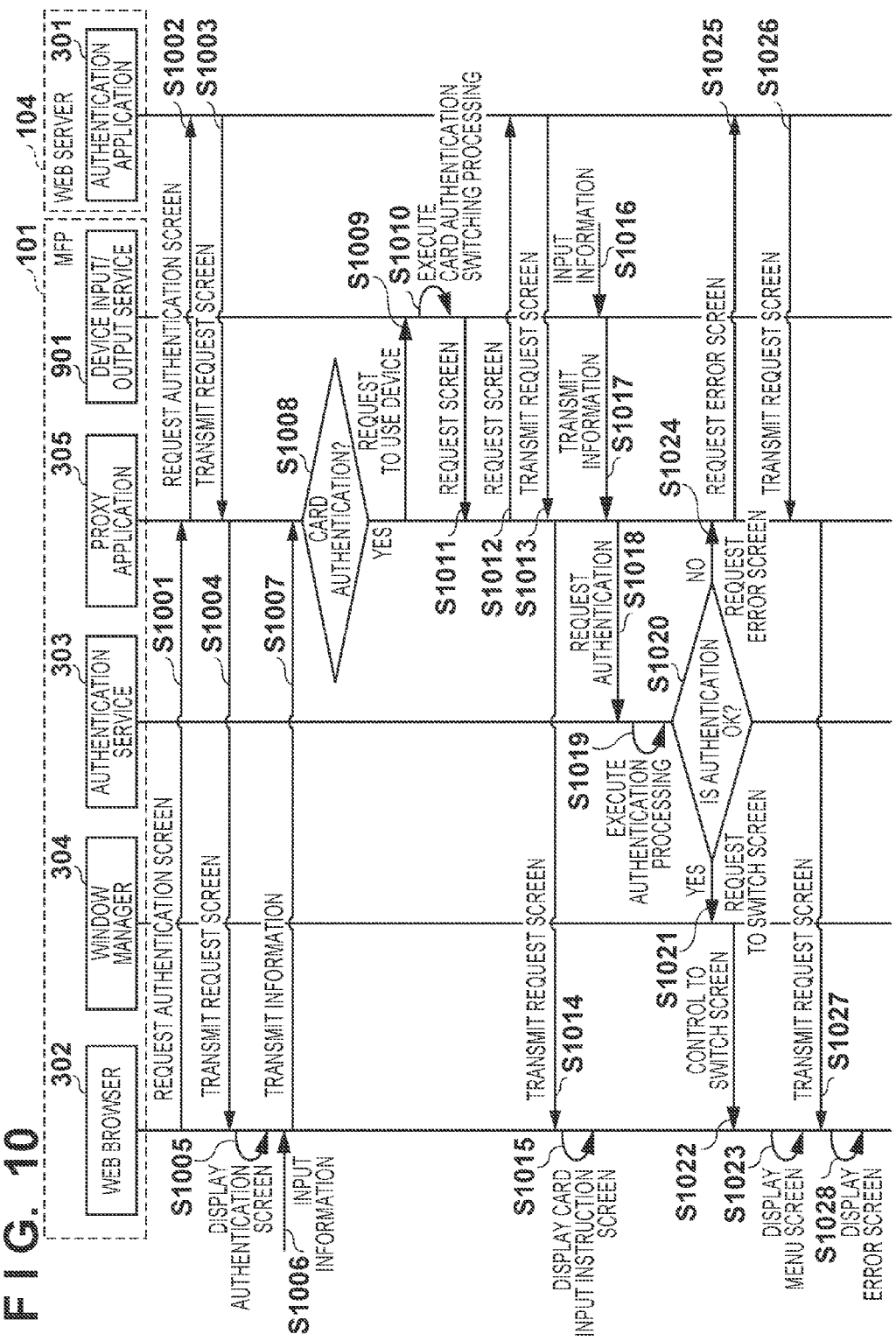

INFORMATION PROCESSING APPARATUS, CONTROL METHOD THEREFOR, AND STORAGE MEDIUM STORING PROGRAM THEREOF

BACKGROUND OF THE INVENTION

1. Field of the Invention

The present invention relates to an information processing apparatus for acquiring an operation screen from a Web server connected to a network, a control method for the information processing apparatus, and a storage medium storing a program thereof.

2. Description of the Related Art

There has been conventionally proposed a technique in which when the authentication application of an information processing apparatus outputs an authentication screen, and performs authentication processing based on authentication information accepted from a user, and then the authentication succeeds, the functions of the information processing apparatus are provided for the user.

As such authentication processing, for example, there is keyboard authentication in which the user uses a keyboard to input authentication information such as a user name and a password to a displayed operation screen and authentication processing is performed using the authentication information.

There is also card authentication as such authentication processing, in which the user holds an IC card over the USB card reader of the information processing apparatus or the like, or inserts the IC card into the reader, and authentication processing is performed by reading authentication information stored in the IC card.

It is well known that it is possible to switch between keyboard authentication and IC card authentication.

There has been conventionally provided an information processing apparatus including a Web browser function within itself to browse a Web site provided by a Web server.

For such an information processing apparatus, there is known a method in which the information processing apparatus is connected with a Web server on a network, and the Web browser of the information processing apparatus displays an authentication screen provided by the Web server to cause the user to perform an operation for authentication. If the authentication processing succeeds, it is possible to provide the user with the functions of the information processing apparatus.

In this case, the information processing apparatus requests an authentication screen from the Web server connected to the network, and the Web application of the Web server responds to the request from the information processing apparatus, and transmits, to the information processing apparatus, contents for causing the Web browser to display the authentication screen. The Web browser of the information processing apparatus analyzes the received contents, and displays an operation screen.

Japanese Patent Laid-Open No. 2007-279974 discloses the following method. That is, when the user inputs authentication information (a user name and a password) to an authentication screen (login screen) displayed on a Web browser, the Web browser notifies a Web server of the input information. Upon receiving the notification, the Web application of the Web server notifies an information processing apparatus of authentication information, and inquires the information processing apparatus about the authentication information. When the user is authenticated, the information processing apparatus notifies the Web server of the authentication result, thereby performing authentication processing.

It is desirable to handle authentication information such as a user name and a password as confidential information that is unknown to third parties.

In the conventional techniques, authentication information that should be handled as confidential information is exchanged between a Web server and an information processing apparatus, which is not preferable for users who want to obtain a higher level of security. Furthermore, unwanted traffic appears on a network.

SUMMARY OF THE INVENTION

An aspect of the present invention is to eliminate the above-mentioned problems with the conventional technology. The present invention provides an information processing apparatus which performs authentication for an information processing apparatus using an operation screen for authentication provided by a Web server without transmitting/receiving authentication information, a control method for an information processing apparatus, and a storage medium storing a program thereof.

The present invention in its first aspect provides an information processing apparatus comprising: an acquisition unit configured to acquire, from a Web server, an operation screen for inputting authentication information; an acceptance unit configured to display the operation screen acquired by the acquisition unit, and accept authentication information input by a user; and an authorization unit configured to execute, in the information processing apparatus without transmitting the authentication information accepted by the acceptance unit to the Web server, authentication processing using the authentication information, and authorize, when the authentication succeeds, the user to use a function of the information processing apparatus.

The present invention in its second aspect provides a control method for an information processing apparatus, comprising: an acquisition step of acquiring, from a Web server, an operation screen for inputting authentication information; an acceptance step of displaying the operation screen acquired in the acquisition step, and accepting authentication information input by a user; and an authorization step of executing, in the information processing apparatus without transmitting the authentication information accepted in the acceptance step to the Web server, authentication processing using the authentication information, and authorizing, when the authentication succeeds, the user to use a function of the information processing apparatus.

The present invention in its third aspect provides a non-transitory computer readable storage medium storing a program for causing a computer to execute: an acquisition step of acquiring, from a Web server, an operation screen for inputting authentication information; an acceptance step of displaying the operation screen acquired in the acquisition step, and accepting authentication information input by a user; and an authorization step of executing, in the information processing apparatus without transmitting the authentication information accepted in the acceptance step to the Web server, authentication processing using the authentication information, and authorizing, when the authentication succeeds, the user to use a function of the information processing apparatus.

The present invention can provide a mechanism capable of performing authentication for an information processing apparatus using an operation screen for authentication provided by a Web server without transmitting/receiving authentication information as confidential information on a network.

It is also possible to perform desired authentication processing without modifying an existing Web browser only by adding a monitoring application to the information processing apparatus.

Furthermore, it is possible to readily make a card authentication device available when an authentication request using an IC card is received.

Further features of the present invention will become apparent from the following description of exemplary embodiments with reference to the attached drawings.

BRIEF DESCRIPTION OF THE DRAWINGS

FIG. 2 is a block diagram showing the configuration of an MFP 101 according to the first to third embodiments of the present invention;

FIG. 3 is a block diagram showing the software configuration of the information processing system according to the first embodiment of the present invention;

FIG. 4 is a sequence chart for explaining the operation of the information processing system according to the first embodiment of the present invention;

FIG. 10 is a sequence chart for explaining the operation of the information processing system according to the third embodiment of the present invention.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

(First Embodiment)

Figure 1:
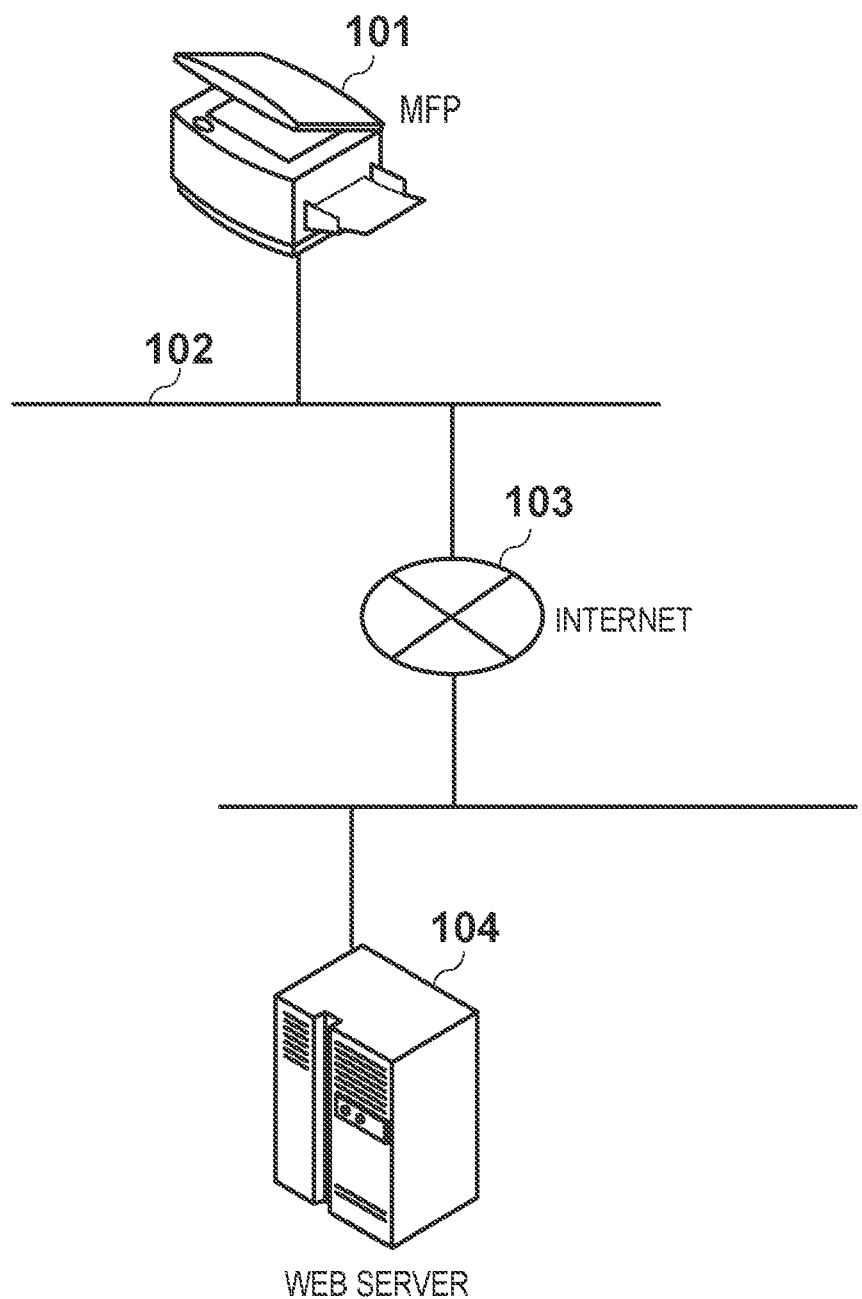
FIG. 1 is a view showing the overall configuration of an information processing system according to the first to third embodiments of the present invention.

The first embodiment of the present invention will be described first. FIG. 1 is a view showing an overall system configuration including an information processing apparatus according to the first embodiment. In this system, an MFP 101 and an external Web server 104 are connected via a network including a LAN (Local Area Network) 102 and the Internet 103.

The MFP 101 has a copy function of scanning a paper medium, and forming and printing an image on a paper sheet based on the scanned data.

The MFP 101 also has a Web browser function to browse a Web site provided by the Web server 104.

The Web server 104 has a function as a general Web site which transmits contents in response to a request from a Web browser as a client.

The Web server 104 also has a function of providing a Web application (to be described later). This enables the MFP 101 to use the service of the Web application from the Web server 104.

FIG. 2 is a block diagram showing the configuration of the MFP 101. The MFP 101 includes a controller unit 200 which can connect an operation display unit 211, an operation input unit 212, and the LAN 102 while connecting a scanner 213 and a printer 214.

Note that the MFP 101 includes the operation display unit 211, the operation input unit 212, the scanner 213, the printer 214, and a USB card authentication device 216 for descriptive convenience in this embodiment. These components may be omitted as needed, or may be external apparatuses.

The controller unit 200 has a CPU (Central Processing Unit) 201 which executes various kinds of control programs. The CPU 201 starts a system based on a boot program stored in a ROM (Read Only Memory) 203. In the system, the CPU 201 reads out a control program stored in an HDD (Hard Disk Drive) 204, and executes predetermined processing using a RAM (Random Access Memory) 202 as a work area.

The HDD 204 stores various kinds of control programs including a function of a Web browser. The HDD 204 also stores scanned data read by the scanner 213 and data acquired from outside the apparatus via a network I/F 207.

An operation unit output I/F 205 controls data output communication to the operation display unit 211.

An operation unit input I/F 206 controls data input communication from the operation input unit 212.

The network I/F 207 is connected to the LAN 102, and controls input/output of information via the LAN 102. The network I/F 207 communicates with an external server to use a Web service of the Web server 104. More specifically, the network I/F 207 transmits a request message to the Web server 104 which provides a service in the external server, and receives a response message transmitted from the Web server.

A scanner I/F 208 inputs image data from the scanner 213, and inputs/outputs scanner control data.

A printer I/F 209 outputs output image data to the printer 214, and inputs/outputs printer control data.

A device input/output I/F 215 receives authentication information (authentication data) from the USB card authentication device 216, and controls to make the USB card authentication device 216 available or unavailable.

The above components 201 to 209 and 215 are arranged on a system bus 210.

The operation input unit 212 serves as a user instruction input interface having an input device such as a touch panel or hard keys.

The operation display unit 211 serves as a display interface for a user, which includes a display device such as an LCD (Liquid Crystal Display) or LED (Light Emitting Diode).

The scanner 213 includes an optical reader such as a CCD (Charge Coupled Device), and has a function of reading electronic image data by optically operating a paper medium.

The printer 214 has a function of forming electronic image data as an image on a printing medium such as a paper sheet.

The USB card authentication device 216 has a function of loading contents of an IC card held over the device 216 by the user in IC card authentication.

FIG. 3 is a block diagram for explaining the overall software configuration of the system. Each function unit shown in FIG. 3 is implemented when the CPU 201 of the MFP 101 reads out and executes a control program stored in the ROM 203 or the HDD 204.

The Web server 104 has a function of an authentication application 301.

The authentication application 301 is used to provide an authentication Web service to the MFP 101. The authentication application 301 has an authentication screen generation unit 310 and an authentication confirmation unit 311.

Upon receiving an authentication screen request from the MFP 101 as a client, the authentication screen generation unit 310 transmits a requested authentication operation screen to the client. The unit 310 can provide a login screen for inputting login information (a user name and a password) for user login or an error screen displayed when authentication fails, which will be described in detail later.

Upon receiving an authentication request together with login information from the MFP 101 as a client, the authentication confirmation unit 311 transmits an authentication request (authentication request data) to the MFP 101, and acquires its result. In transmitting an authentication request, the unit 311 also transmits the login information acquired as described above. The authentication confirmation unit 311 transmits an authentication request and login information to an authentication service 303 of the MFP 101 (to be described in detail later), and acquires its result.

If the authentication result of the above-described authentication request is NG, the authentication screen generation unit 310 generates an error screen, and transmits it to the client. In this embodiment, the authentication confirmation unit 311 functions when the MFP 101 has no proxy application 305. That is, the authentication confirmation unit 311 is a function included in the Web server by assuming that an MFP having a conventional internal configuration uses the authentication application 301 serving as a Web service. This enables to use the service of the authentication application 301 even when an MFP having a conventional Web browser and authentication service makes an access.

The MFP 101 has functions of a Web browser 302, the authentication service 303, the proxy application 305, and a window manager 304. Although the proxy application 305 may also be called a monitor application, the expression "proxy application" is used here.

The Web browser 302 acquires Web contents from the Web server 104 via the proxy application 305, and displays them on the operation display unit 211. Furthermore, based on a user instruction input through the operation input unit 212, the Web browser 302 transmits a request to the Web server 104 via the proxy application 305.

The Web browser 302 includes a content acquisition unit 320 and a screen rendering unit 321.

The content acquisition unit 320 transmits a content acquisition request to the Web server 104 via the proxy application 305. Furthermore, the unit 320 receives, as contents, a response transmitted from the Web server 104 via the proxy application 305. Then, based on the received contents, the unit 320 generates a screen to be displayed on the operation display unit 211.

The screen rendering unit 321 displays the screen generated by the content acquisition unit 320 on the operation display unit 211. In fact, the unit 321 sends a rendering instruction to a screen rendering control unit 340 of the window manager 304 to render a screen on the operation display unit 211.

The proxy application 305 exists between the Web browser 302 and the Web server 104, and has a function as a proxy and a function of monitoring contents transmitted by the Web browser 302. The proxy application includes a data monitoring unit 350 and an authentication request unit 351.

The data monitoring unit 350 monitors data contents transmitted/received between the Web browser 302 and the Web server. More specifically, the data monitoring unit 350 determines whether data transmitted by the content acquisition unit 320 contains predefined login information. The data monitoring unit 350 sends an authentication request to the authentication request unit 351 (to be described later) together with login information. Upon receiving a screen request from the authentication request unit 351, the data monitoring unit 350 sends a screen request to the authentication application 301.

The authentication request unit 351 sends an authentication request to the authentication service 303 together with login information, and acquires its result. If the authentication result of the authentication request is NG, the unit 351 requests an error screen of the authentication screen generation unit 310 of the authentication application 301.

The window manager 304 switches among the Web browser 302 and other application screens to be displayed on the operation display unit 211, and controls display of buttons for switching among respective application screens. The window manager 304 includes the screen rendering control unit 340.

Upon receiving an instruction from the screen rendering unit 321 or an access control unit 331, the screen rendering control unit 340 switches a screen displayed on the operation display unit 211. More specifically, upon receiving a screen rendering request from the screen rendering unit 321, the screen rendering control unit 340 displays the above-described login screen or error screen. Upon receiving a screen rendering request from the access control unit 331, the screen rendering control unit 340 switches from the login screen to main menu display. This authorizes the user to use the functions of the MFP 101.

FIG. 4 is a sequence chart for explaining a series of processes of authentication processing (login processing) in the system. Each operation shown in the sequence chart of FIG. 4 is implemented when the CPU 201 of the MFP 101 executes a control program.

In step S401, the Web browser 302 requests an authentication screen (login screen) of the authentication application 301 of the Web server 104. In this embodiment, since the proxy application 305 exists, the authentication screen request of the Web browser 302 is actually sent via the proxy application 305. In step S401, therefore, the authentication screen request of the Web browser 302 is actually an instruction for the proxy application 305. Since communication between the Web browser 302 and the authentication application 301 is made via the proxy application 305, the request is explicitly represented as an instruction for the proxy application 305.

In step S402, the proxy application 305 notifies the authentication application 301 of the request of the Web browser 302 intact. That is, the proxy application 305 sends an authentication screen request to the authentication application 301. In step S403, the authentication application 301 generates a requested authentication screen, and transmits it to the proxy application 305. In step S404, the proxy application 305 transmits the acquired authentication screen to the Web browser 302.

In step S405, the Web browser 302 displays the acquired authentication screen on the operation display unit 211. In step S406, the user inputs login information to the authentication screen displayed on the Web browser 302 to log in the MFP 101.

In step S407, the Web browser 302 transmits the input login information to the proxy application 305 to send an authentication request.

The proxy application 305 generally monitors, at all times, a request transmitted from the Web browser 302 to the authentication application 301. Since the request transmitted in step S407 contains the login information, the process advances to step S408, and the proxy application 305 sends an authentication request to an authentication function execution unit 330 of the authentication service 303. At this time, the proxy application 305 also transmits the login information transmitted in step S407.

In step S409, the authentication function execution unit 330 of the authentication service 303 executes authentication processing. The process then advances to step S410 to determine whether the authentication result of the authentication processing in step S409 is OK or NG. If the authentication result is OK, the process advances to step S411, and the access control unit 331 of the authentication service 303 sends a screen switching request to the window manager 304. In step S412, the screen rendering control unit 340 of the window manager 304 controls to switch the screen displayed on the operation display unit 211 to a main menu screen. This means that a login operation has succeeded, and the Web browser 302 displays a local menu screen on the operation display unit 211 in step S413.

Alternatively, if it is determined in step S410 that the authentication result is NG, the authentication service 303 requests an error screen of the proxy application 305 in step S414. In step S415, the proxy application 305 sends, to the authentication application 301, the error screen request from the authentication service 303 without any change.

In step S416, the authentication application 301 generates an error screen requested in step S415, and transmits it as a request screen to the proxy application 305.

In step S417, the proxy application 305 transmits the received request screen (error screen) to the Web browser 302 without any change.

In step S418, the Web browser 302 displays the received error screen on the operation display unit 211.

As described above, it is possible to execute the authentication processing (login processing) for the MFP 101.

Figure 5A:
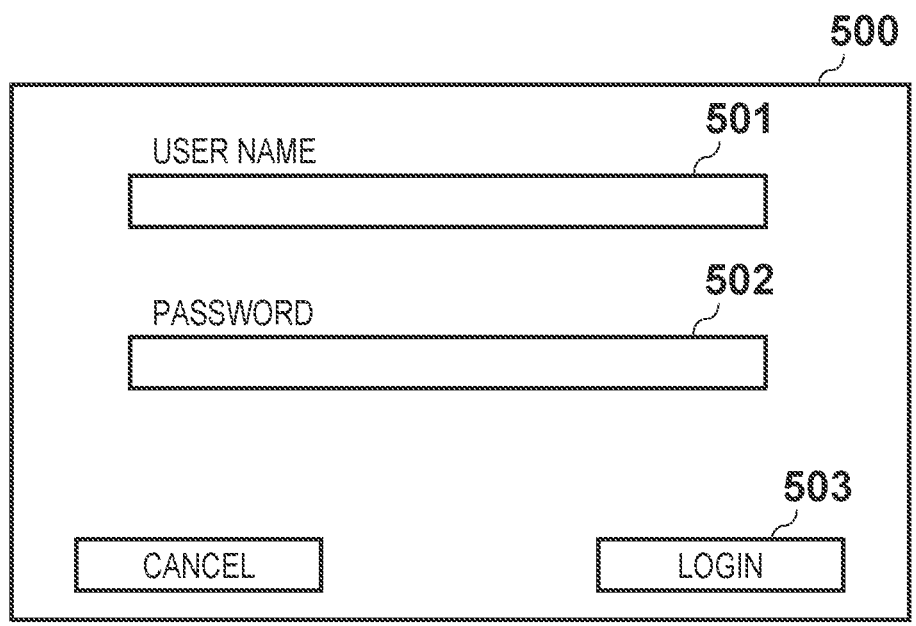
FIGS. 5A and 5B are views each showing an operation screen displayed on an operation display unit 211 of the MFP 101 according to the first to third embodiments of the present invention.
Figure 5B:
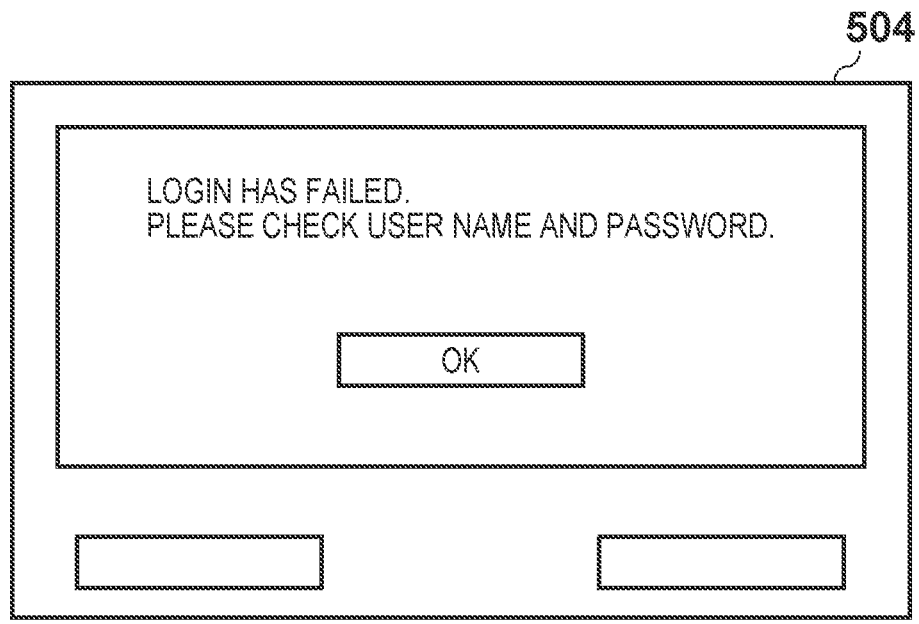

FIGS. 5A and 5B are views each showing a screen, displayed on the operation display unit 211, necessary for the authentication processing (login processing), which has been described with reference to FIG. 4.

FIG. 5A is a view showing an example of the authentication screen (login screen) displayed in step S405 of FIG. 4. Screen 500 denotes a screen in which input regions necessary for a login operation and buttons are arranged; 501, a region where a user name as information necessary for the login operation is input; and 502, a region where a password as information necessary for the login operation is input.

Button 503 denotes a login button. When the button is pressed, the authentication processing (login processing) described in step S407 and subsequent steps of FIG. 4 is executed.

FIG. 5B is a view showing the error screen displayed in step S418 of FIG. 4. Region 504 denotes a region where an error message is displayed. Pressing an OK button in FIG. 5B enables to set the error screen to a non-display state, and to display again the screen 500 of FIG. 5A in which the input regions necessary for a login operation and the buttons are arranged.

Figure 6:
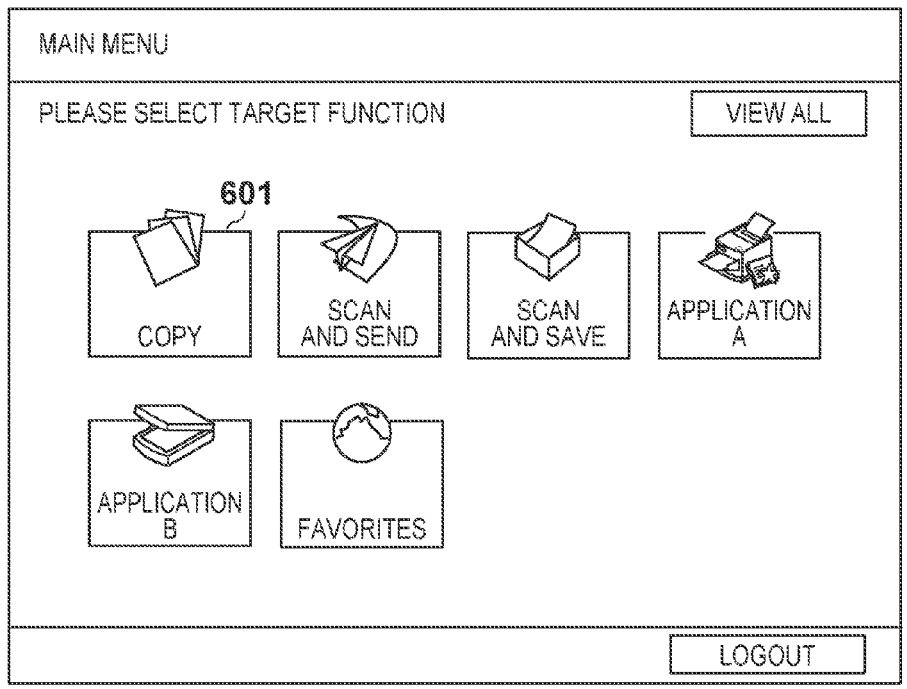
FIG. 6 is a view showing a main menu screen displayed on the operation display unit 211 of the MFP 101 according to the first to third embodiments of the present invention.

FIG. 6 shows a main menu which is displayed on the operation display unit 211 when the authentication result is OK in step S411 of FIG. 4. The main menu of FIG. 6 shows a state in which various kinds of menu icons and buttons necessary for an operation in the MFP 101 are arranged. This screen allows the user to use the various kinds of functions and services of the MFP 101.

(Second Embodiment)

The second embodiment of the present invention will be described. Note that a system configuration and the like are the same as those in the first embodiment and only parts different from the first embodiment will be explained. In the second embodiment, authentication processing (login processing) is executed, which is the same point as in the first embodiment. A difference from the first embodiment is that a Web browser 302 executes the processing of the proxy application 305.

Figure 7:
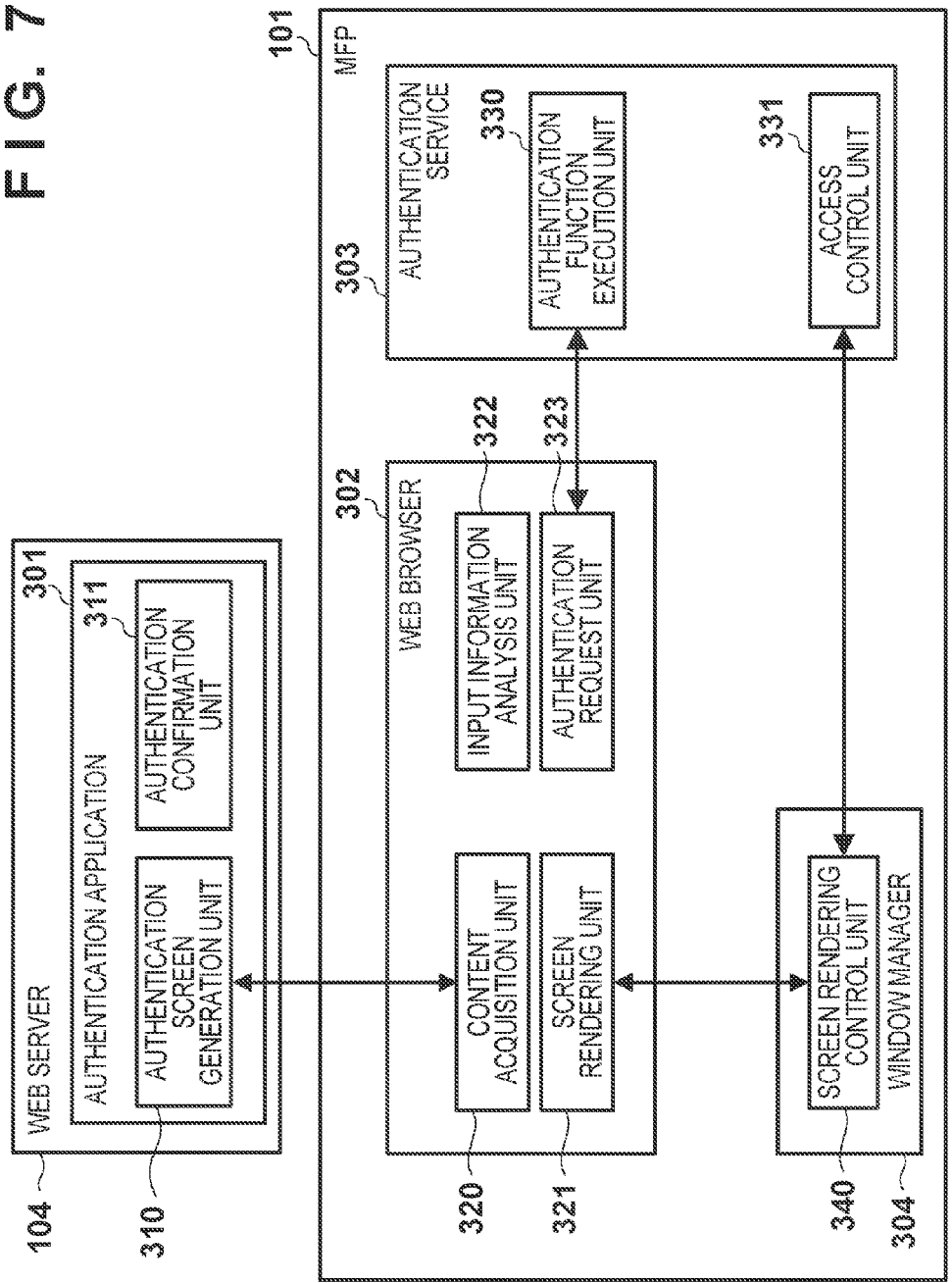
FIG. 7 is a block diagram showing the software configuration of the information processing system according to the second embodiment of the present invention.

FIG. 7 is a block diagram for explaining the overall software configuration of a system according to the second embodiment. As compared with FIG. 3 in the first embodiment, the proxy application 305 is omitted and the Web browser 302 executes the processing of the proxy application 305 instead.

Each function unit shown in FIG. 7 is implemented when a CPU 201 of an MFP 101 reads out and executes a control program stored in a ROM 203 or an HDD 204.

The Web browser 302 communicates with a Web server 104, and acquires Web contents from the Web server 104 to display them on an operation display unit 211. Based on a user instruction input through an operation input unit 212, the Web browser 302 transmits a request to the Web server 104.

The Web browser 302 includes a content acquisition unit 320, a screen rendering unit 321, an input information analysis unit 322, and an authentication request unit 323.

The content acquisition unit 320 and the screen rendering unit 321 are the same as those described in the first embodiment, and a description thereof will be omitted. Note that the content acquisition unit 320 directly communicates with an authentication application 301.

The input information analysis unit 322 determines whether contents designated by the user through an authentication screen (login screen) displayed on the operation display unit 211 contain login information. The unit 322 then sends an authentication request to an authentication service 303 via the authentication request unit 323 of the Web browser 302 (to be described later).

The authentication request unit 323 sends an authentication request to the authentication service 303 together with the login information, and acquires its result. If the authentication result of the authentication request is NG, the unit 323 requests an error screen of an authentication screen generation unit 310.

A window manager 304 switches among the Web browser 302 and other application screens to be displayed on the operation display unit 211, and controls display of buttons for switching among respective application screens. The window manager 304 includes a screen rendering control unit 340.

Upon receiving an instruction from the screen rendering unit 321 or an access control unit 331, the screen rendering control unit 340 switches a screen displayed on the operation display unit 211. More specifically, upon receiving a screen rendering request from the screen rendering unit 321, the unit 340 displays the above-described login screen or error screen. Upon receiving a screen rendering request from the access control unit 331, the unit 340 switches from the login screen to main menu display.

Figure 8:
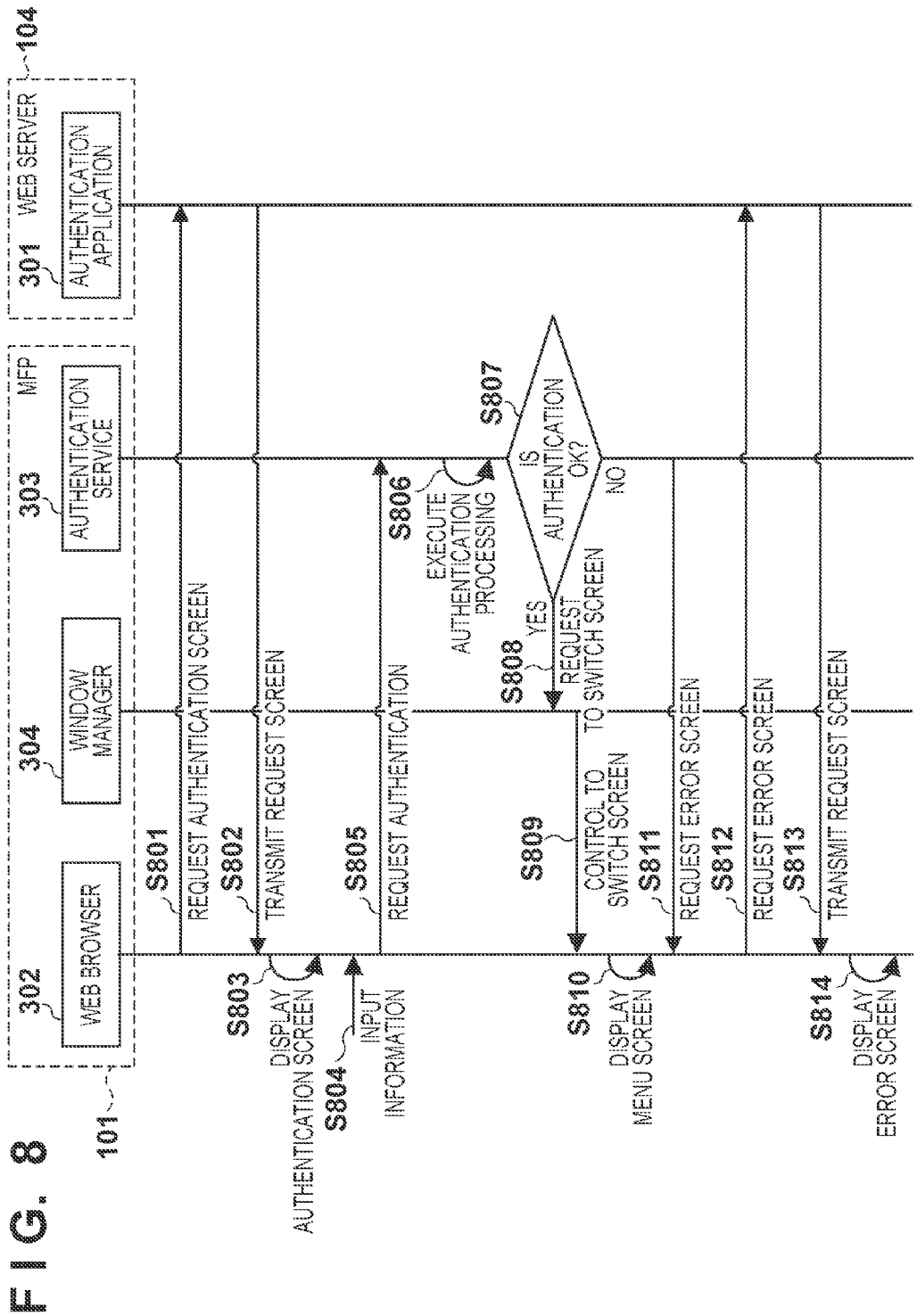
FIG. 8 is a sequence chart for explaining the operation of the information processing system according to the second embodiment of the present invention.

FIG. 8 is a sequence chart showing authentication processing (login processing) in the system according to the second embodiment. Each operation shown in the sequence chart of FIG. 8 is implemented when the CPU 201 of the MFP 101 executes a control program.

In step S801, the Web browser 302 requests an authentication screen (login screen) of the authentication application 301 of the Web server 104.

In step S802, the authentication application 301 transmits a generated authentication screen to the Web browser 302.

In step S803, the Web browser 302 displays the acquired authentication screen on the operation display unit 211.

In step S804, the user inputs login information to the authentication screen displayed on the Web browser 302 to log in the MFP 101.

Since the information input in step S804 contains the login information, the process advances to step S805, and the authentication request unit 323 of the Web browser 302 sends an authentication request to the authentication function execution unit 330 of the authentication service 303. At this time, the unit 323 also transmits the input login information.

In step S806, the authentication function execution unit 330 of the authentication service 303 executes authentication processing. The process then advances to step S807 to determine whether the authentication result of the authentication processing in step S806 is OK or NG. If the authentication result is OK, the process advances to step S808, and the access control unit 331 of the authentication service 303 sends a screen switching request to the window manager 304. In step S809, the screen rendering control unit 340 of the window manager 304 controls to switch the screen displayed on the operation display unit 211 to a main menu screen. This means that a login operation has succeeded, and the Web browser 302 displays a local menu screen on the operation display unit 211 in step S810.

Alternatively, if it is determined in step S807 that the authentication result is NG, the authentication service 303 requests an error screen of the Web browser 302 in step S811. In step S812, the Web browser 302 sends, to the authentication application 301, the error screen request from the authentication service 303 without any change.

In step S813, the authentication application 301 generates an error screen requested in step S812, and transmits it as a request screen to the Web browser 302.

In step S814, the Web browser 302 displays the received error screen on the operation display unit 211.

The screen examples, displayed on the operation display unit 211, necessary for the authentication processing (login processing), which have been described with reference to FIG. 8 are the same as those shown in FIGS. 5A, 5B, and 6, and a description thereof will be omitted.

As described above, it is possible to execute the authentication processing (login processing) for the MFP 101.

(Third Embodiment)

The third embodiment of the present invention will be described. Note that a system configuration and the like are the same as those in the first embodiment and only parts different from the first embodiment will be explained. In the third embodiment, authentication processing (login processing) is executed, which is the same point as in the first embodiment. A difference from the first embodiment is that the authentication processing (login processing) is executed by IC card authentication when the IC card authentication is instructed.

Figure 9:
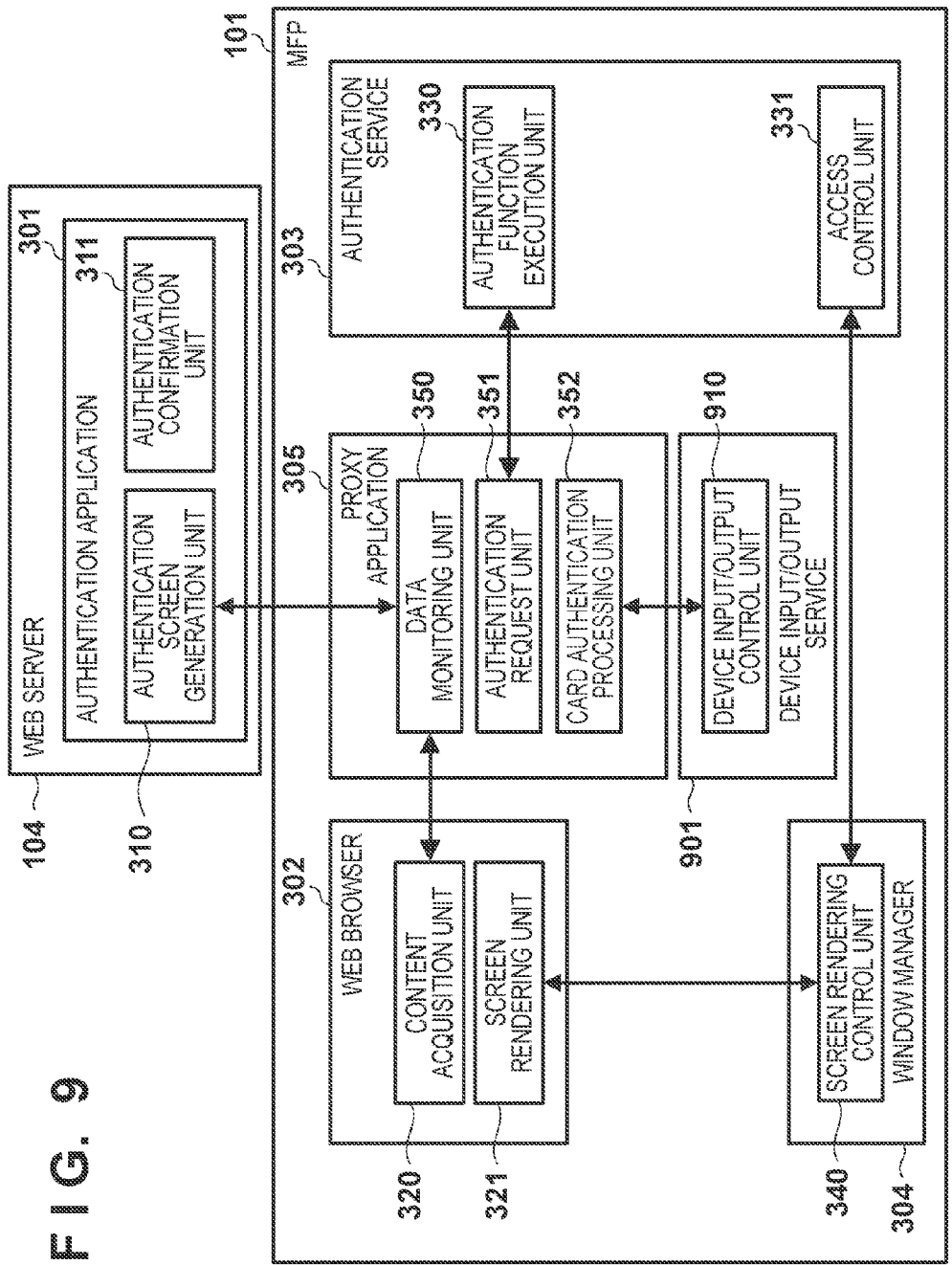
FIG. 9 is a block diagram showing the software configuration of the information processing system according to the third embodiment of the present invention.

FIG. 9 is a block diagram for explaining the overall software configuration of a system according to the third embodiment of the present invention. Each function unit shown in FIG. 9 is implemented when a CPU 201 of an MFP 101 reads out and executes a control program stored in a ROM 203 or an HDD 204.

Different points from FIG. 3 described in the first embodiments will be explained.

As different points from FIG. 3, a card authentication processing unit 352 is added to a proxy application 305, and a device input/output service 901 is added to the MFP 101. Other components are the same as those shown in FIG. 3.

The device input/output service 901 of FIG. 9 includes a device input/output control unit 910. The device input/output control unit 910 communicates with a device input/output I/F 215 described with reference to FIG. 2, and makes a USB card authentication device 216 available. The device input/output control unit 910 acquires authentication information from the USB card authentication device 216. The authentication information indicates information for a login operation such as a user name and a password, which is stored in an IC card held over the USB card authentication device 216 by the user.

The card authentication processing unit 352 communicates with the device input/output control unit 910 of the device input/output service 901, and sends a request to make the USB card authentication device 216 available. The card authentication processing unit 352 also executes processing of, for example, acquiring login information from the USB card authentication device 216.

In the third embodiment, a data monitoring unit 350 of the proxy application 305 monitors not only data contents transmitted/received by the Web browser 302 but also the login information acquired by the card authentication processing unit 352.

FIG. 10 is a sequence chart showing authentication processing (login processing) according to the third embodiment. Each operation shown in the sequence chart of FIG. 9 is implemented when the CPU 201 of the MFP 101 executes a control program.

In step S1001, the Web browser 302 requests an authentication screen (a login screen shown in FIG. 11A) of an authentication application 301 of the Web server 104. Also in the third embodiment, since the proxy application 305 exists, the authentication screen request of the Web browser 302 is actually sent via the proxy application 305. In step S1001, therefore, the authentication screen request of the Web browser 302 is an instruction for the proxy application 305. Since communication between the Web browser 302 and the authentication application 301 is made via the proxy application 305, the request is explicitly represented as an instruction for the proxy application 305.

In step S1002, the proxy application 305 notifies the authentication application 301 of the request of the Web browser 302 intact. That is, the proxy application 305 sends an authentication screen request to the authentication application 301.

In step S1003, the authentication application 301 generates an authentication screen requested in step S1002, and transmits it to the proxy application 305. In step S1004, the proxy application 305 transmits the acquired authentication screen to the Web browser 302.

In step S1005, the Web browser 302 displays the acquired authentication screen (see FIG. 11A) on an operation display unit 211. In step S1006, to log in the MFP 101, the user selects to perform IC authentication or to input login information to the authentication screen displayed on the Web browser 302. The Web browser 302 transmits, to the proxy application 305, the information input by the user.

In step S1008, based on the received information, the proxy application 305 determines whether the Web browser 302 has requested IC card authentication. If it is determined in step S1008 that IC card authentication has been requested, the proxy application 305 sends, to the device input/output service 901, a request to make the USB card authentication device 216 available to enable IC card authentication in step S1009. In step S1010, the device input/output service 901 executes processing of making the USB card authentication device 216 available and switching to IC card authentication.

In step S1011, the device input/output service 901 sends, to the proxy application 305, a screen request for instructing the user to hold a card over the USB card authentication device 216. In step S1012, the proxy application 305 notifies the authentication application 301 of the request of the device input/output service 901 intact.

In step S1013, the authentication application 301 generates a card input instruction screen requested in step S1012, and transmits it to the proxy application 305. In step S1014, the proxy application 305 transmits the acquired card input instruction screen to the Web browser 302.

In step S1015, the Web browser 302 displays the acquired card input instruction screen (see FIG. 11B) on the operation display unit 211. In step S1016, the user holds an IC card over the USB card authentication device 216 according to the instruction of the card input instruction screen, thereby inputting login information. In step S1017, the device input/output service 901 transmits, to the proxy application 305, the login information input by the user. In step S1018, the proxy application 305 sends an authentication request to an authentication service 303. In step S1019, an authentication function execution unit 330 of the authentication service 303 executes authentication processing based on the received information.

The process then advances to step S1020 to determine whether the authentication result of the authentication processing in step S1019 is OK or NG. If the authentication result is OK, the process advances to step S1021, and an access control unit 331 of the authentication service 303 sends a screen switching request to a window manager 304. In step S1022, a screen rendering control unit 340 of the window manager 304 controls to switch the screen displayed on the operation display unit 211 to a main menu screen. This means that a login operation has succeeded, and the Web browser 302 displays a local menu screen on the operation display unit 211 in step S1023.

Alternatively, if it is determined in step S1020 that the authentication result is NG, the authentication service 303 requests an error screen of the proxy application 305 in step S1024. In step S1025, the proxy application 305 sends, to the authentication application 301, the error screen request from the authentication service 303 without any change.

In step S1026, the authentication application 301 generates an error screen requested in step S1025, and transmits it as a request screen to the proxy application 305.

In step S1027, the proxy application 305 transmits the received request screen (error screen) to the Web browser 302 without any change.

In step S1028, the Web browser 302 displays the received error screen on the operation display unit 211.

As described above, in the authentication processing (login processing) for the MFP 101, it is possible to execute IC card authentication using the USB card authentication device 216.

If it is not determined in step S1008 that IC card authentication has been requested, that is, the Web browser 302 transmits login information to the proxy application 305 in step S1007 as in the first embodiment, the same processing as that from step S408 of FIG. 4 is executed.

Figure 11A:
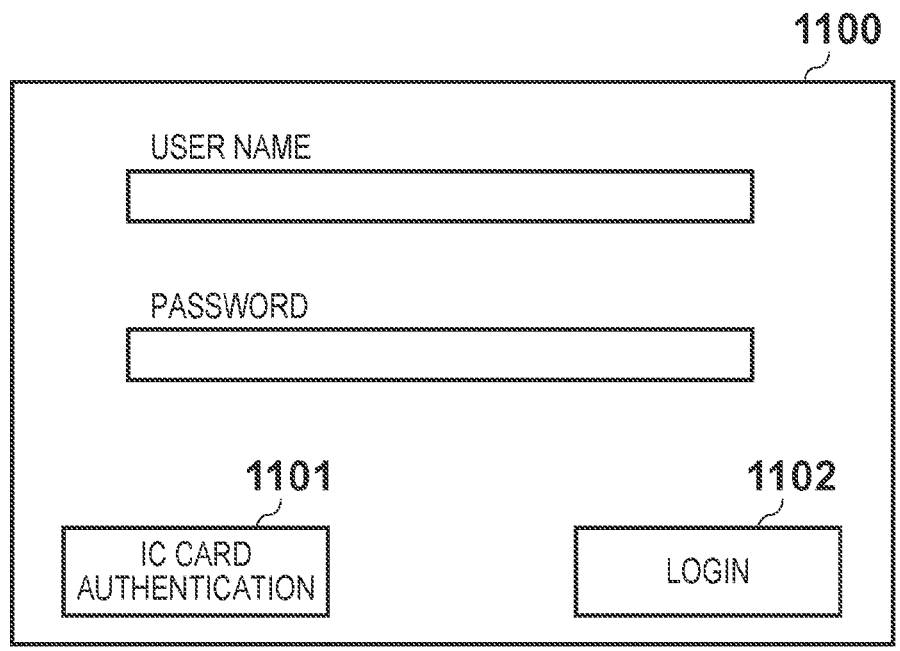
FIGS. 11A and 11B are views each showing an operation screen displayed on the operation display unit 211 of the MFP 101 according to the third embodiment of the present invention.
Figure 11B:
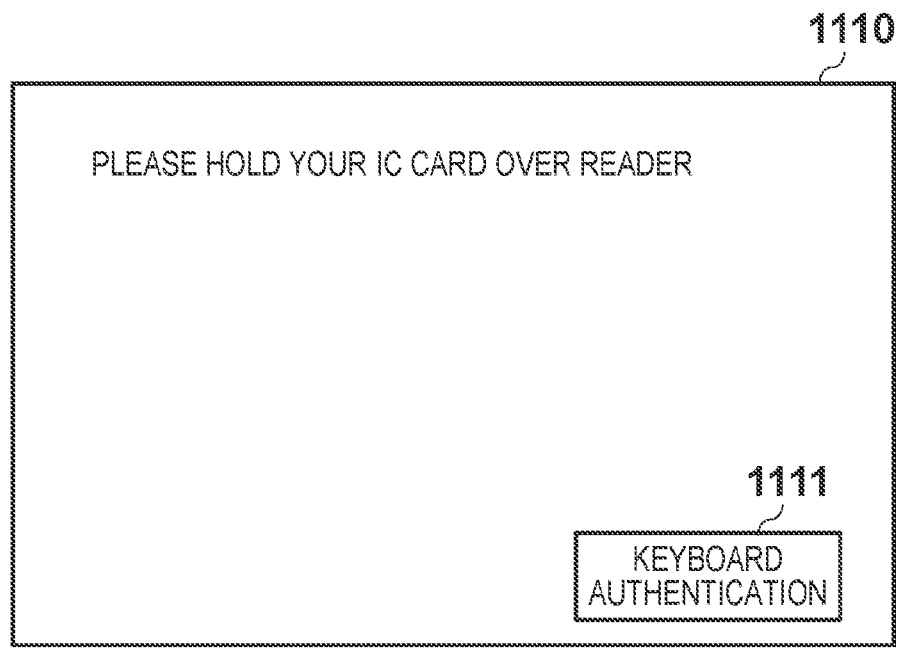

FIGS. 11A and 11B are views each showing a screen, displayed on the operation display unit 211, necessary for the authentication processing (login processing), which has been described with reference to FIG. 9.

FIG. 11A is a view showing a keyboard authentication screen (login screen) displayed first in the third embodiment. Screen 1100 denotes a screen in which input regions where a user name, a password, and the like necessary for a login operation are input and buttons are arranged. Button 1102 denotes a login button, which is pressed when the user logs in with values input in the user name and password regions. When the login button 1102 is pressed, the same authentication processing (login processing) as that described in the first embodiment is executed.

Button 1101 denotes a button for switching to an IC card authentication screen. In the third embodiment, when the IC card authentication switching button 1101 is pressed, the processing from step S1007 is executed to perform IC card authentication processing. On the other hand, when the login button is pressed, the same processing as in the first embodiment, that is, the processing from step S407 of FIG. 4 is executed.

FIG. 11B is a view showing an IC card input instruction screen displayed in step S1015 of FIG. 10. Region 1110 denotes a region where a message and a button are displayed, which displays a message to instruct to hold an IC card over the USB card authentication device 216. Button 1111 denotes a switching button for keyboard authentication. When the keyboard authentication button is pressed, the Web browser 302 requests a keyboard authentication screen of the authentication application 301, and displays the screen shown in FIG. 11A.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-025342, filed Feb. 8, 2011, which is hereby incorporated by reference herein in its entirety.

What is claimed is:

1. An information processing apparatus comprising:
a receiving unit configured to receive, from a Web server, an authentication screen for inputting user information;
a display unit configured to display, by a Web browser, the authentication screen received by the receiving unit;
an acceptance unit configured to accept the user information input by a user who is operating the information processing apparatus, via the authentication screen displayed by the Web browser;

an authorization unit configured to execute authentication processing using the user information accepted via the authentication screen displayed by the Web browser, and authorize, in a case where the authentication processing succeeds, the user to use a function of the information processing apparatus; and a controlling unit configured to control the authentication unit to execute the authentication processing based on the user information, without transmitting the user information accepted via the authentication screen displayed by the Web browser to the Web server, wherein the receiving unit, the acceptance unit, and the authorization unit are implemented, at least in part, by a processor and a memory.

2. The apparatus according to claim 1, wherein the authentication screen includes an input area for inputting the user information.

3. The apparatus according to claim 2, further comprising:
a monitoring unit configured to monitor a request to be transmitted from the Web browser to the Web server, and
a transmission unit configured to transmit, in a case where the request to be transmitted from the Web browser to the Web server contains the user information accepted via the authentication screen displayed by the Web browser, the user information accepted via the authentication screen displayed by the Web browser to an authentication service within the information processing apparatus.

4. The apparatus according to claim 1, further comprising
a request unit configured to request an error screen to the Web server in a case where the authentication processing fails.

5. A control method for an information processing apparatus, comprising:
receiving, from a Web server, an authentication screen for inputting user information;
displaying, by a Web browser, the received authentication screen;
accepting the user information input by a user who is operating the information processing apparatus, via the authentication screen displayed by the Web browser;
executing authentication processing using the accepted user information, and authorizing, in a case where the authentication processing succeeds, the user to use a function of the information processing apparatus; and
wherein the authentication processing is executed based on the accepted user information, without transmitting the user information accepted via the authentication screen displayed by the Web browser to the Web server.

6. The control method according to claim 5, wherein the authentication screen includes an input area for inputting the user information.

7. The control method according to claim 6, further comprising:
monitoring a request to be transmitted from the Web browser to the Web server, and
transmitting, in a case where the request to be transmitted from the Web browser to the Web server contains the accepted user information, the accepted user information to an authentication service within the information processing apparatus.

8. The control method according to claim 5, further comprising
requesting an error screen to the Web server in a case where the authentication processing fails.

9. A non-transitory computer readable storage medium storing a program for causing a computer to execute:
receiving, from a Web server, an authentication screen for inputting user information;
displaying, by a Web browser, the received authentication screen;
accepting the user information input by a user who is operating the information processing apparatus, via the authentication screen displayed by the Web browser;
executing authentication processing using the accepted user information, and authorizing, in a case where the authentication processing succeeds, the user to use a function of the information processing apparatus; and
wherein the authentication processing is executed based on the accepted user information, without transmitting the user information accepted via the authentication screen displayed by the Web browser to the Web server.

* * * * *